United States Patent

[11] 3,560,766

[72] Inventor James O. Moore
Williamstown, Mass.

[21] Appl. No 792,461
[22] Filed Jan. 21, 1969
[45] Patented Feb. 2, 1971

[73] Assignee Sprague Electric Company
North Adams, Mass.
a corporation of Massachusetts

[54] HIGH SPEED LOGIC ELEMENT
5 Claims, 3 Drawing Figs.

[52] U.S. Cl. .......... 307/291, 307/247, 307/292, 307/299
[51] Int. Cl. .......... H03k 3/26
[50] Field of Search .......... 307/247, 289, 291, 292, 299

[56] References Cited

UNITED STATES PATENTS

| | | | |
|---|---|---|---|
| 3,229,119 | 1/1966 | Bohn | 307/299 |
| 3,384,766 | 5/1968 | Kardash | 307/292 |

*Primary Examiner*—Stanley T. Krawczewicz
*Assistant Examiner*—David M. Carter
*Attorneys*—Connolly and Hutz, Vincent H. Sweeney, James Paul O'Sullivan and David R. Thornton

ABSTRACT: A JK flip-flop circuit is provided which has been optimized for high counting or toggle rates and low differential delay. A unique bilateral triggering circuit is used to steer current between node pairs rather than unilaterally from a single node thereby eliminating multigate feedback paths which retard counting or toggle rates and increase differential delay.

HIGH SPEED LOGIC ELEMENT

BACKGROUND OF THE INVENTION

This invention relates to elements of a digital computer high speed counting or memory system and in particular to a JK flip-flop circuit which has been modified so as to increase its counting or toggle rate and reduce its differential delay.

The JK flip-flop differs from the RS flip-flop in that when both inputs are true, the latter will not go into a definable state whereas the JK flip-flop reverses state (toggles) under the same input conditions. This feature makes it attractive as a counter element and memory stage in digital computers.

Conventional JK flip-flops employ external steering circuits which unilaterally drive the set or reset terminals to switch one output of the flip-flop which in turn drives the other side to the desired logic level. This process requires the turning on-and-off of gates employed in the latch circuit and leads to unavoidable delays. The latch time, which is the sum of the turn on and turnoff delay time of the gates presents an obstacle to high frequency counting operations. The differential delay time between output transitions also decreases the reliability of the computer system.

Still another undesirable aspect of the conventional high speed JK flip-flop is the presence of a power supply transient which creates noise in the system and increases power dissipation with increasing operational frequency.

A higher operational speed is desirable in applications such as digital signal processing, radar ranging, and shift registers. It is therefore one object of the present invention to provide a flip-flop circuit which performs the JK function at rates in excess of 100 MHz and hence, is desirable for use in these applications.

It is a further object to provide such a flip-flop circuit having nearly zero differential delay between output transition states.

It is a still further object to provide a more efficient circuit by elimination of power supply transients.

It is another object to provide a saturated circuit which can be operated over a temperature range of −55° C. to +125° C.

SUMMARY OF THE INVENTION

Broadly, a semiconductor logic element constructed in accordance with this invention comprises a flip-flop circuit having bilateral triggering means causing the output state to compliment after each trigger pulse. More particularly, a pair of cross coupled NAND gates are arranged so as to bias the bases of the flip-flop transistors in a regenerative fashion. Cross coupled capacitors provide the inertia to drive the output to the opposite state upon application of a clock pulse simultaneously applied to a pair of AND gates.

The use of bilateral triggering and cross-coupled capacitors causes one output to simultaneously be turned on while the other is being turned off. This reduces the number of gate delays from two to one in achieving a change of state. This feature permits a higher operational frequency. The change of state also occurs simultaneously thereby eliminating the delay normally associated with such state changes.

DESCRIPTION OF THE DRAWINGS

Referring now to FIG. 1, the bilateral triggering section comprises transistors 11 and 12, resistor 13 and their primed counterparts 11′,12′ and 13′ while the latching section comprises transistors 14, 15, diode 16, capacitor 17, resistors 20, 21 and 22 and their primed counterparts.

Figure 1:
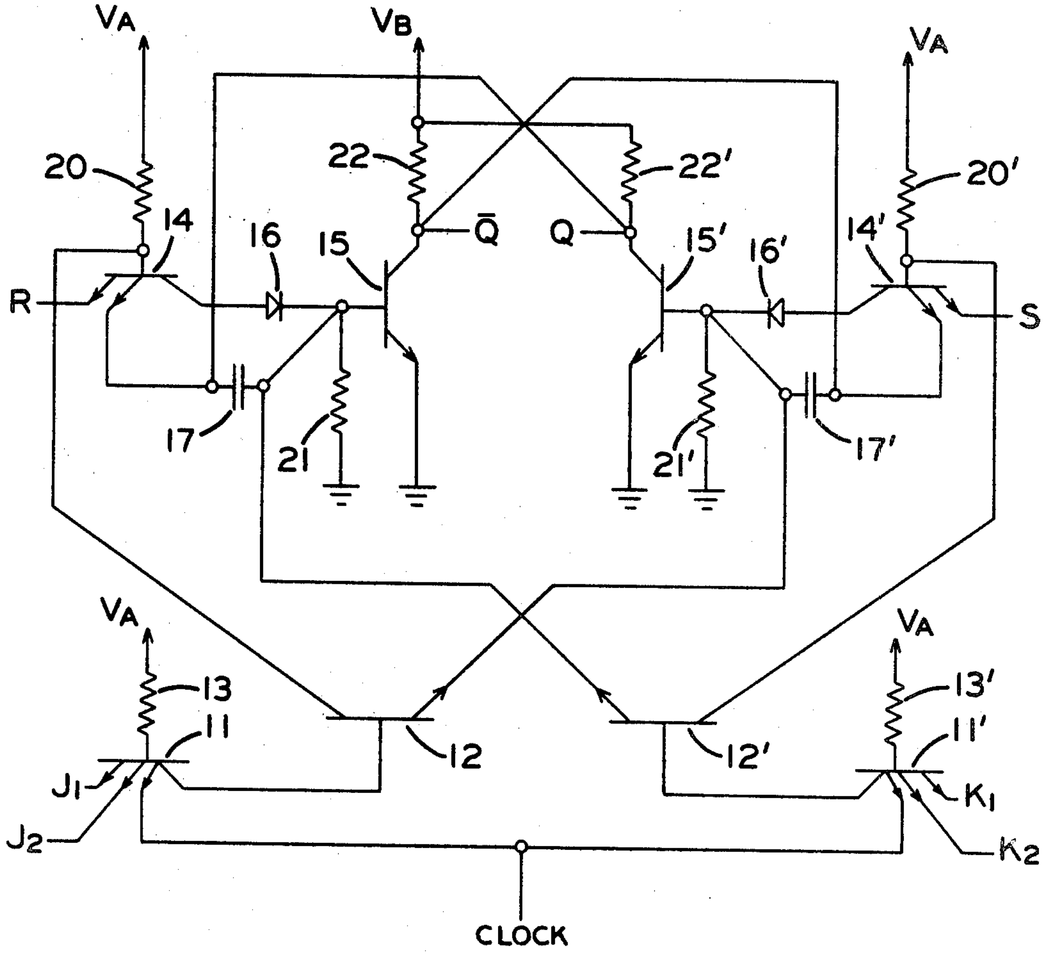
FIG. 1 shows a circuit diagram of the preferred embodiment of the invention.

The J and K inputs are applied to the emitters of AND gates 11 and 11′ respectively and a clock pulse is commonly applied to a parallel connection of a J and a K input. The base of each gate is connected through resistor 13, 13′ to a common positive voltage source $V_A$ The collector of each gate 11, 11′ is connected to the base of transistors 12, 12′ respectively. The collectors of transistors 12, 13′ are connected to the bases of transistors 14, 14′ and to common voltage source $V_A$ through resistors 20, 20′ The emitters of transistor 12, 12′ are connected to the base of transistors 15′, 15.

Transistors 14 and 14′ have their bases connected to source $V_A$ through resistors 20, 20′. Their collector outputs are connected to the base of transistors 15, 15′ through diodes 16, 16′. Resistors 21, 21′ are connected to ground between the diode and transistor base. The collectors of transistors 15, 15′ are connected through resistors 22, 22o voltage source $V_B$ while the emitters are grounded. The outputs $\overline{Q}$ and Q to each side of the latch circuit are taken from the collectors of transistor 15, 15′ respectively. Regenerative feedback capacitors 17, 17′ are connected between the output and the base of transistors 15′, 15.

The operation of the circuit is described in the following paragraphs and is based on the following assumptions: the circuit is in steady state (dv/dt across capacitors 17, 17s zero); output Q is high (logic 1 level); output $\overline{Q}$ is low (logic 0 level); and the circuit is to operate in the toggle mode (inputs at J and K are at a logic 1 level with triggering being accomplished by a positive clock pulse of approximately 3 volts and 4 to 6 nanoseconds width). Under these conditions, the voltage at the base of transistor 15′ will be zero and the voltage at the base of transistor 15 will be 0.8 volt. Transistor 12 will begin to conduct before transistor 12′ ince the emitter of transistor 12 is connected to the base of transistor 15′ which is at zero volts. Transistor 12 begins to conduct when the collector of transistor 11 reaches 0.8 volt. As the leading edge of the clock pulse reaches approximately 0.8 volt the current through resistor 13 is diverted into the base of transistor 12 causing it to turn on. Transistor 12′ does not conduct at this time because its emitter is biased at 0.8 volt and thus requires 1.6 volts at its base for conduction to begin. Since transistor 12 is conducting, a current path is provided between resistor 20, which supplies current to the base of transistor 15, through transistor 12 to the base of transistor 15′. As transistor 12 becomes saturated, current is prevented from flowing to the base of transistor 15 and is rather diverted to the base of transistor 15′. This current "steering" has the effect of turning transistor 15 off and turning transistor 15′ on thus changing the state of the flip-flop simultaneously. The initial rapid change of voltage of Q and $\overline{Q}$ causes a displacement current to flow through capacitors 17 and 17′ in a regenerative sense so as to continue driving Q to the 0 state and $\overline{Q}$ to the 1 state or, stated another way, causing transistor 15′ to become saturated and transistor 15 to become cut off.

Without the capacitors in the circuit, the process initiated by the trigger would only proceed to the point where the bias on the emitters of transistor 12 and 12′ are equal. Transistor 12′ would then begin to conduct tending to force $\overline{Q}$ back towards its zero state. The capacitors thus provide memory to drive the circuit past this point.

Upon change of state, the DC regenerative feedback path formed by the connections between the collector of transistor 15′ and emitter of transistor 14 and between the collector of transistor 15 and emitter of transistor 14′ a uses the flip-flop to remain in its new state indefinitely or until another clock pulse changes its state. Another clock pulse would reverse the operation with the current flowing from the Q side of the latch through transistor 12′ to the base of transistor 15.

The base drive current to transistor 15, which is supplied by resistor 20 is partially diverted through resistor 21 in order to sharpen the transfer characteristics near the threshold level. Diode 16 is used to increase the gate threshold to approximately 1.5 volts to make it compatible with the industry standard for TTL gates. The diode is also designed for low storage and capacitance so that referring to the above circuit description, the trigger current will not be diverted through diode 16′ and transistor 14′ which is initially saturated. A zero on the R and S inputs will set or reset the latch circuit depending on which side the signal is applied.

The circuit is operated by two supply voltages $V_1$ and $V_B$. The former supplies the current for the multiemitter transistors 14, 14', and 11 and 11'. It is desirable to keep the current into the bases of the input transistors as constant as possible with respect to the input logic level. V s hould therefore be as high as possible and the industry standard of 5.0 volts was used in the present circuit. Power supply $V_B$ supplies the current for the output transistors 15 and 15' and, since the major portion of the circuit power is dissipated here, it is desirable to optimize the supply voltage with respect to minimum speed power product. An optimum supply voltage of 3.0 volts has been used in the present circuit.

Operation in the RS mode (J or K input is 0 and the other is 1) is similar to the above description. For example, if J is 1, K is 0 and = 1 or if K is 1, J is 0 and $\overline{Q}$ is 1, the above operation is the same except that the clock pulse can be of any width greater than that required to trigger the circuit. In the RS mode, there is no restriction on the J and K pulse except to avoid a logical 1 level being present on both J and K since this is the indeterminate state of the flip-flop or, alternately, the clock pulse width is unrestricted provided J and K inputs are not simultaneously at the 1 level.

The above-described circuit operates in the toggle or RS mode at frequencies in excess of 100 MHz and with differential delays (measured at the center of logic swing) of 1 nanosecond or less. There is no power supply transients present in the circuit and the average power dissipation is approximately 77 mW. The "high" output state is fully saturated to that "no compromise" operation is possible over the full military range (−55 to +125° C.).

Figure 2:
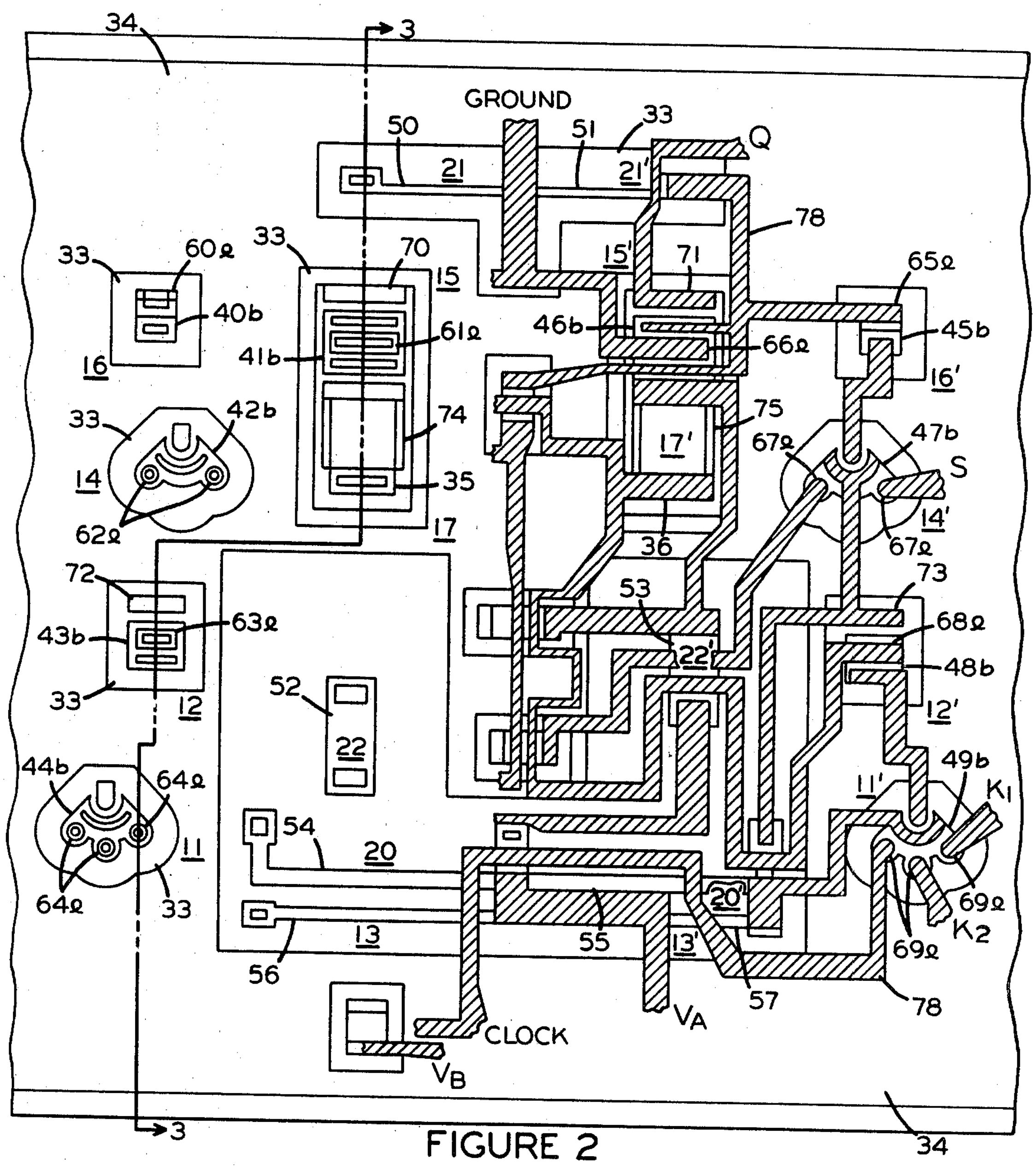
FIG. 2 shows the circuit of FIG. 1 formed in a monolithic semiconductor structure.
Figure 3:
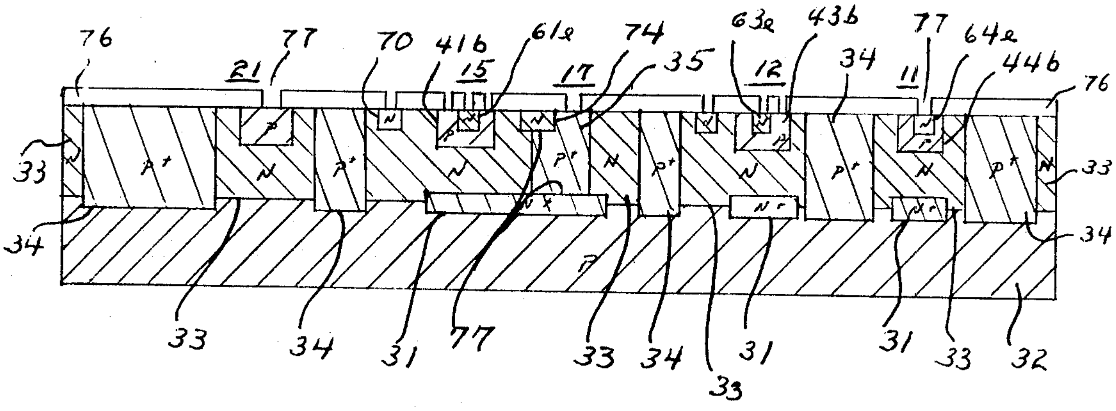
FIG. 3 shows a cross-sectional view through line 3–3 of FIG. 2

FIG. 2 shows a top view of the circuit described above monolithically formed in a silicon chip while FIG. 3 shows a cross-sectional view of the chip. The circuit components are formed by producing adjoining regions of opposite semiconductivity type by diffusion and masking techniques known to those skilled in the pertinent art. The properties of the transistors, diodes, capacitors and resistors depend upon the dimensional parameters of the P and N regions; the materials used in these regions, the dopant concentrations of the diffusants and other factors within the knowledge of skilled artisans in the pertaining art. For example, use can be made of the methods described in the text "Integrated Circuit Engineering - Basic Technology" by Glen R. Modland, et al. Boston Publishers Inc. 1966.

Viewing FIGS. 2 and 3, high impurity N±type regions 31 are first diffused into the relatively high resistivity. P-type substrate 32 under the areas where transistors 11, 11' and 12, 12', 14, 14' and 15, 15' and diodes 16, 16' are to be formed. A portion of the N±type region lying beneath transistors 15, 15 is also used in forming capacitors 17, 17'. An epitaxial N-type layer 33 having an impurity concentration suitable for the collector region of the transistors is then formed over the entire surface of substrate 32.

Deep P-type diffusions 34, 35 and 36 are then made through epitaxial layer 33. Diffusions 35 and 36 contact the high impurity N±type regions 31 below transistors 15, 15' and form capacitors 17, 17'. Diffusions 34 contact substrate 32 and form isolation areas between the components.

P-type base regions **40*b* through 49*b* are subsequently formed by conventional base diffusion processes. P-type regions 50 through 58 are also diffused into epitaxial layer 33 forming resistors 13, 13', 20, 20' 2 1, 21' and 22, 22'. Emitter N±type regions 60*e* through 69*e* are diffused into base regions 40*b* through 49*b*; and N±type contact regions 70, 71, 72 and 73 are diffused into epitaxial layer 33. Additional N±type regions 74 and 75 are diffused so as to be partly in regions 35 and 36 respectively and partly in the adjoining epitaxial layer. The junction of regions 35 and 36 with region 74 and 75 add to the capacitance of capacitors 17, 17'. Diodes 16, 16 reformed by shorting the transistor emitter regions 60*e* and 65*e* and the corresponding collector regions together (not shown). The N±side of the diode is the shorted junction, the P-side being the base diffusion areas 40*b* and 45*b*. The entire surface of the device is covered by a layer 76 of silicon dioxide ($SiO_2$) which is nonconductive. Contact regions, 77** are then formed by etching away portions of the $SiO_2$ layer.

The various components are interconnected as shown in FIG. 1 by interconnect path 78. For purposes of clarity, only one-half the circuit is shown interconnected. The interconnect path, which can be aluminum or any other suitable metal, is deposited through a mask so as to make contact at the desired component terminals (not shown). Inputs, outputs and ground connections can be made to the end of the terminals as indicated. A sintering cycle at high temperatures completes the aluminum to silicon contacts.

A feature of the fabrication procedure is the degree of control which can be exercised over the construction of capacitors 17, 17'. The value of capacitance depends upon two factors: the area of the junctions 77 and the concentration of P+ diffusion region 35 (for the case of capacitor 17). Neither factor is critical to other elements of the circuit; hence the P+i ffusion can be adjusted without effect on the rest of the circuit. For example, increasing the ohm-resistivity of the region from 10 to 30 Ω/cm doubles the capacitance.

Since it is obvious that many changes and modifications can be made in the above-described details without departing from the nature and spirit of the invention it is to be understood that the invention is not limited to said details except as set forth in the appended claims.

I claim:

1. A flip-flop circuit comprising, a pair of output transistors: first and second multiemitter transistor means for receiving set and reset signals connected to the inputs of said output transistors;

capacitive means cross-coupled between the outputs of said output transistors and their inputs, said connection causing regenerative feedback to be applied to the output transistors on opposite sides of the circuit;

means for biasing said first, second and output transistors; and bilateral triggering means connected to the biasing means for said first and second transistors and to the inputs of said output transistors so that, upon application of an appropriate trigger, the output transistor which is off is driven on and the biasing of the on transistor is altered so as to drive said transistor off, said actions occurring simultaneously and effecting a simultaneous change of state of said output transistors.

2. A flip-flop circuit as described in claim 1 wherein said bilateral triggering means comprises:

a third and fourth multiemitter transistor;

means for applying input signals to said third and fourth transistors and including means for simultaneous application of a clock pulse to each transistor emitter input;

fifth and sixth transistor means having their outputs cross-coupled to the inputs to said output transistors and having their collectors connected to said first and second transistors and biasing means so as to create a unidirectional flow of current away from one side of the circuit and to the other side, depending upon the state of the circuit and the bias level of the transistors.

3. A JK flip-flop circuit comprising:

a pair of output transistors whose collector output determines the state of the flip-flop and whose emitters are grounded;

a first pair of multiemitter transistors having their collector outputs connected to the bases of said output transistors via a diode and grounded resistor, and having one emitter DC connected to the output transistor collector on the opposite side of said multiemitter transistor;

a voltage source and output resistor in series with the collectors of said output transistors;

a pair of capacitors each connected between the collector of one output transistor and the base of the opposing output transistor;

a pair of emitter follower transistors having their collectors connected between the bases of said first pair of multiemitter transistors and their associated voltage source and resistor and having their emitters cross-coupled to the bases of the output transistor on the opposite side of the circuit;

a second pair of multiemitter transistors having their collector outputs connected to the bases of said emitter follower transistors and having two emitters connected to logic inputs and a third emitter commonly connected to a clock pulse; and a voltage source and current limiting resistor in series with the bases of said first and second pair of multiemitter transistors.

4. A flip-flop circuit according to claim 3 wherein the components comprising said circuit are formed in a semiconductor body comprising:

a plurality of first regions of high impurity concentration N±type of semiconductivity in PN junction forming relation with the surface of a high resistivity P-type semiconducting substrate;

an epitaxial layer of N-type of semiconductivity extending over the surface of said substrate and first regions, said layer also acting as a transistor collector region;

a plurality of second regions of P-type of semiconductivity in PN junction forming relation with said epitaxial layer;

a plurality of second regions of P±type of semiconductivity extending through said epitaxial region to contact the remaining first region, whereby capacitors are formed;

third regions of N±type conductivity in PN junction forming relation with at least a portion of said second regions over said first and second regions whereby said first, second and third regions and the portions of the epitaxial layer between said first and second regions cooperate to form a plurality of transistors having a collector (first region), a base (second region) and an emitter (third region) or plurality of emitters;

a plurality of high impurity concentration P±type second regions of semiconductivity diffused through said epitaxial layer so as to form electrical isolation areas surrounding components of said circuit;

a plurality of said third regions of N±type of conductivity diffused across the junction formed by said capacitor forming second region of P-type conductivity and abutting epitaxial layer;

a plurality of said third regions of N±type of conductivity diffused into said epitaxial layer so as to form electrical contact areas to transistor collector regions;

a plurality of regions of P-type of semiconductivity in PN junction forming relation with said epitaxial layer forming a plurality of resistors thereby;

terminal means for supplying an input signal to those transistors having multiple emitters and terminal means for removing an output signal from the collectors of the output transistors;

means for electrically interconnecting said transistors, diodes, capacitors and resistors.

5. A flip-flop circuit according to claim 4 wherein the resistivity of said second regions of capacitor forming P±type of semiconductivity is increased or decreased to yield like changes in capacitance values, said resistivity changes being effected without altering other parts of the circuit.

UNITED STATES PATENT OFFICE
CERTIFICATE OF CORRECTION

Patent No. 3,560,766 Dated February 2, 1971

Inventor(s) James O. Moore

It is certified that error appears in the above-identified patent and that said Letters Patent are hereby corrected as shown below:

Column 2, line 3, " 13' " should read -- 12' --
Column 2, line 12, "22, $22_O$" should read -- 22, 22' to --
Column 2, line 20, "17, $17_S$" should read -- 17, 17' is --
Column 2, line 28, "i nce" should read -- since --
Column 2, line 59, "a uses" should read -- causes
Column 3, line 5, "V s hould" should read -- $V_A$ should --
Column 3, line 15, after "and" (first occurrence) insert -- Q --
Column 3, line 29, "to" should read -- so --
Column 3, line 49, "15, 15" should read -- 15, 15'
Column 3, line 54, "P-type" should read -- P+type
Column 3, line 69, "16, 16 re-" should read -- 16, 16' are --
Column 4, line 17, "i f-" should read -- dif- --
Column 4, line 27, (claim 1), after "comprising" change the comma to a colon and after "transistors" change the colon to a semicolon Signed and sealed this 8th day of June 1971.

(SEAL)
Attest:

EDWARD M.FLETCHER,JR.
Attesting Officer

WILLIAM E. SCHUYLER, JR.
Commissioner of Patents